United States Patent
Robinson et al.

(10) Patent No.: US 9,767,365 B2
(45) Date of Patent: Sep. 19, 2017

(54) MONITORING SYSTEM AND METHOD FOR QUEUE

(71) Applicants: UDP Technology Ltd., Seoul (KR); VCA TECHNOLOGY LTD, Chessington, Surrey (GB)

(72) Inventors: Neil Stanley Robinson, Surbiton (GB); Benjamin Andrew White, Sanderstead (GB); Geoffrey Lawrence Thiel, East Molesey (GB); Benjamin Benfold, Farnborough (GB); Yeon Hag Chou, Seoul (KR); Seung Chan Lee, Seoul (KR); Seung Il Chung, Seoul (KR)

(73) Assignees: UDP Technology Ltd., Seoul (KR); VCA TECHNOLOGY LTD, Chessington, Surrey (GB)

( * ) Notice: Subject to any disclaimer, the term of this patent is extended or adjusted under 35 U.S.C. 154(b) by 196 days.

(21) Appl. No.: 14/739,865

(22) Filed: Jun. 15, 2015

(65) Prior Publication Data
US 2016/0292514 A1 Oct. 6, 2016

(30) Foreign Application Priority Data
Apr. 6, 2015 (KR) .................. 10-2015-0048616

(51) Int. Cl.
*G06K 9/00* (2006.01)
*G06K 9/62* (2006.01)
*G06K 9/20* (2006.01)
*G06T 7/73* (2017.01)

(52) U.S. Cl.
CPC ..... *G06K 9/00778* (2013.01); *G06K 9/00208* (2013.01); *G06K 9/00214* (2013.01); *G06K 9/2018* (2013.01); *G06K 9/6202* (2013.01); *G06K 9/623* (2013.01); *G06K 9/6218* (2013.01); *G06T 7/73* (2017.01);
(Continued)

(58) Field of Classification Search
None
See application file for complete search history.

(56) References Cited

U.S. PATENT DOCUMENTS

| | | | |
|---|---|---|---|
| 2009/0041297 A1* | 2/2009 | Zhang | G06K 9/00362 382/103 |
| 2012/0051594 A1* | 3/2012 | Kim | G06K 9/00771 382/103 |
| 2016/0224845 A1* | 8/2016 | Gyger | G06K 9/00778 |

OTHER PUBLICATIONS

Cai, Ling, et al. "Multi-object detection and tracking by stereo vision." Pattern Recognition 43.12 (2010): 4028-4041.*

* cited by examiner

*Primary Examiner* — Sean Conner
(74) *Attorney, Agent, or Firm* — Hauptman Ham, LLP (57) ABSTRACT

The present invention relates to a system and a method of monitoring a queue that allow for exactly recognizing objects in a queue and exactly monitoring the situation of the queue by tracking the recognized objects, using depth detection device such as a TOF camera. According to the present invention, it is possible to map a space and an image using depth information provided through a depth detection device without mapping a 3D space to an image taken by a camera and exactly measure the actual heights of objects from the ground using depth information of the objects and the background and initial parameters of the depth detection device so that desired objects can be exactly detected and recognized in filtering. Accordingly, the system can be less complicated. Further, waiting time is assigned to recognized objects so that they can be easily tracked.

10 Claims, 12 Drawing Sheets

(52) U.S. Cl.
CPC ............... *G06T 2207/10028* (2013.01); *G06T 2207/30196* (2013.01); *G06T 2207/30232* (2013.01)

MONITORING SYSTEM AND METHOD FOR QUEUE

CROSS-REFERENCE TO RELATED APPLICATION

This application claims the benefit of Korean Application No. 10-2015-0048616, filed on Apr. 6, 2015 with the Korean Intellectual Property Office, the disclosure of which is incorporated herein by reference.

BACKGROUND OF THE INVENTION

1. Field of the Invention

The present invention relates to a system and a method of monitoring a queue, and more particularly, to a system and a method of monitoring a queue that allow for exactly recognizing objects in a queue and exactly monitoring the situation of the queue by tracking the recognized objects, using depth detection device such as a TOF camera.

2. Description of the Related Art

Recently, with development of various object tracking algorisms for tracking objects in an image taken by cameras and development of the capacity of cameras, systems for monitoring objects using those algorisms and devices have been considerably developed.

Such systems for monitoring objects are applied to various fields such as measuring traffic, counting visitors, or monitoring a queue, in addition to a system for monitoring invaders or abnormal situations.

Existing systems for monitoring objects acquires an image by photographing objects in an actual 3D space, using a camera, in which the objects in the image are different in size in accordance with the distances from the camera, and even the same objects may be different in size, so it is required to calibrate the camera in order to exactly recognize desired objects in the image.

Accordingly, those systems for monitoring object receive initial parameters (height, angle, FOV, and the like) of a camera, map an actual 3D photographing space to an image taken by the camera, and perform calibration such that objects in the 3D space exactly correspond to the object in the image.

However, according to the calibration, it is required to set the size values of every objects and the depth value of the space to correspond to the positions of the objects in a 3D space, so the process of mapping the 3D space to the actual image is very complicated. Further, even if they are the same objects, it is required to specifically set the relationships of the objects in the 3D space and the object in the 2D image in consideration of the initial parameters of the camera and the different in size according to the positions of the objects in the 3D space, so those systems are considerably complicated. Further, if a space is complicated, it is further difficult to set the relationships between the setting values obtained by mapping a 3D space to an image and other setting values, so setting is very difficult.

Further, according to existing systems for monitoring objects that monitors a queue by mapping a 3D space to an image, when objects frequently change in size due to continuous movement of a queue in the process of tracking people in the queue as objects, the systems frequently fail to track the recognized objects, so reliability and exactness of the systems significantly decrease.

PRIOR ART DOCUMENT

Patent Document (Patent Document 1) Korean Patent No. 10-0331050

SUMMARY OF THE INVENTION

An object of the present invention is to enable mapping a space and an image using depth information provided by a depth detection device without mapping a 3D space to an image taken by a camera, and exactly recognizing desired objects by exactly measuring the actual heights of the objects from the ground using initial parameters of the depth detection device and the depth information of objects and a background, and to increase reliability and exactness in monitoring objects in a queue by exactly recognizing and continuously tracking the objects in the queue.

Another object of the present invention is to enable exactly recognizing objects even if the objects are close to each other, continuously tracking the same objects even if a queue moves, and increasing exactness of tracking objects in a queue by exactly excepting object not related to the queue.

According to an aspect of the present invention, a system for monitoring a queue may include: an image receiving unit that receives image information including depth information of objects and a background of a photographing space through a depth detection device; an object information collector that calculates actual heights of the objects using the depth information of the objects and the background obtained from the image information and initial parameters including a height and an angle measured by a sensing unit in the depth detection device; a filter that creates cluster set information composed of a plurality of items of cluster information calculated by filtering the objects in the image information to a plurality of different height values; and an object tracking unit that recognizes the objects by comparing the cluster set information with a predetermined pattern, assigns waiting time information for counting the time from the point of time when the objects are recognized, to the objects, and tracks the objects in the queue in accordance with the queue order.

According to an embodiment of the present invention, the depth detection device may be any one of a TOF (Time Of Flight) camera, a stereo camera, and an image analyzer using a structured light pattern.

According to an embodiment of the present invention, the object tracking unit may recognize a ground in the background, create a queue pattern information of a queue pattern by determining areas where the objects are positioned on the ground, queue order and direction, provide information about a queue situation by applying the queue pattern information to plane information corresponding to the ground.

According to an embodiment of the present invention, the object tracking unit may determine the direction of the queue in accordance with movement vectors of the objects calculated by tracking the objects in the queue.

According to an embodiment of the present invention, the object tracking unit may determine the direction of the queue on the basis of the movement vectors of the objects obtained by tracking the objects and remove objects having movement vectors different from the direction of the queue from objects to track.

According to an embodiment of the present invention, the object tracking unit may update waiting time information by counting waiting time assigned to the objects in real time and determine waiting orders of the objects in the queue in the order of longer waiting time in accordance with the waiting time information.

According to an embodiment of the present invention, the object information collector may calculate the actual heights of the objects by calculating a difference in depth information of the background and objects respectively in the same line with a camera from the image information and then putting the difference to the trigonometric function, together with the depth information of the background and the initial parameters.

According to an embodiment of the present invention, the filter may create the cluster information by filtering the others except for areas corresponding to the height values or more.

According to an embodiment of the present invention, the cluster information may be a set of pixels obtained for one height value and the cluster set information may be information created by three-dimensionally accumulating sets of pixels corresponding to the cluster information in accordance with height values.

According to an embodiment of the present invention, when there is an overlap area between cluster information obtained for different height values, the filter may remove the overlap area from cluster information having a lower height value.

According to an embodiment of the present invention, the image information may further include a visible light image, and the object information collector may map the background and the visible light image to each other on the basis of depth information for the space obtained from the image information.

According to another aspect of the present invention, a method of monitoring a queue, which monitors a queue made by objects in a photographing space using a depth detection device, includes: an image receiving step that receives image information including depth information of objects and a background of a photographing space through the depth detection device; an object information collecting step that calculates actual heights of the objects using the depth information of the objects and the background obtained from the image information and initial parameters including a height and an angle measured by a sensing unit in the TOF camera; a filtering step that creates cluster set information composed of a plurality of items of cluster information calculated by filtering the objects in the image information to a plurality of different height values; and an object tracking step that recognizes the objects by comparing the cluster set information with a predetermined pattern, assigns waiting time information for counting the time from the point of time when the objects are recognized, to the objects, and tracks the objects in the queue in accordance with the queue order.

According to the present invention, it is possible to map a space and an image using depth information provided through a depth detection device without mapping a 3D space to an image taken by a camera and exactly measure the actual heights of objects from the ground using depth information of the objects and the background and initial parameters of the depth detection device so that desired objects can be exactly detected and recognized in filtering. Accordingly, the system can be less complicated. Further, waiting time is assigned to recognized objects so that they can be easily tracked. Furthermore, reliable information about a queue situation is provided by exactly determining the pattern of the queue made by objects.

Further, it is possible to exactly recognize objects even if the objects are close to each other, continuously track the same objects on the basis of the waiting time assigned to the objects, even if a queue moves, and increase exactness of tracking objects in a queue by finding out a queue pattern and exactly excepting object not related to the queue.

BRIEF DESCRIPTION OF THE DRAWINGS

FIGS. 9A to 10B are exemplary views illustrating a process of assigning waiting time to objects and tracking objects by the system for monitoring a queue according to an exemplary embodiment of the present invention.

DETAILED DESCRIPTION OF THE PREFERRED EMBODIMENTS

Hereinafter, exemplary embodiments of the present invention will be described in detail with reference to the drawings.

Figure 1:
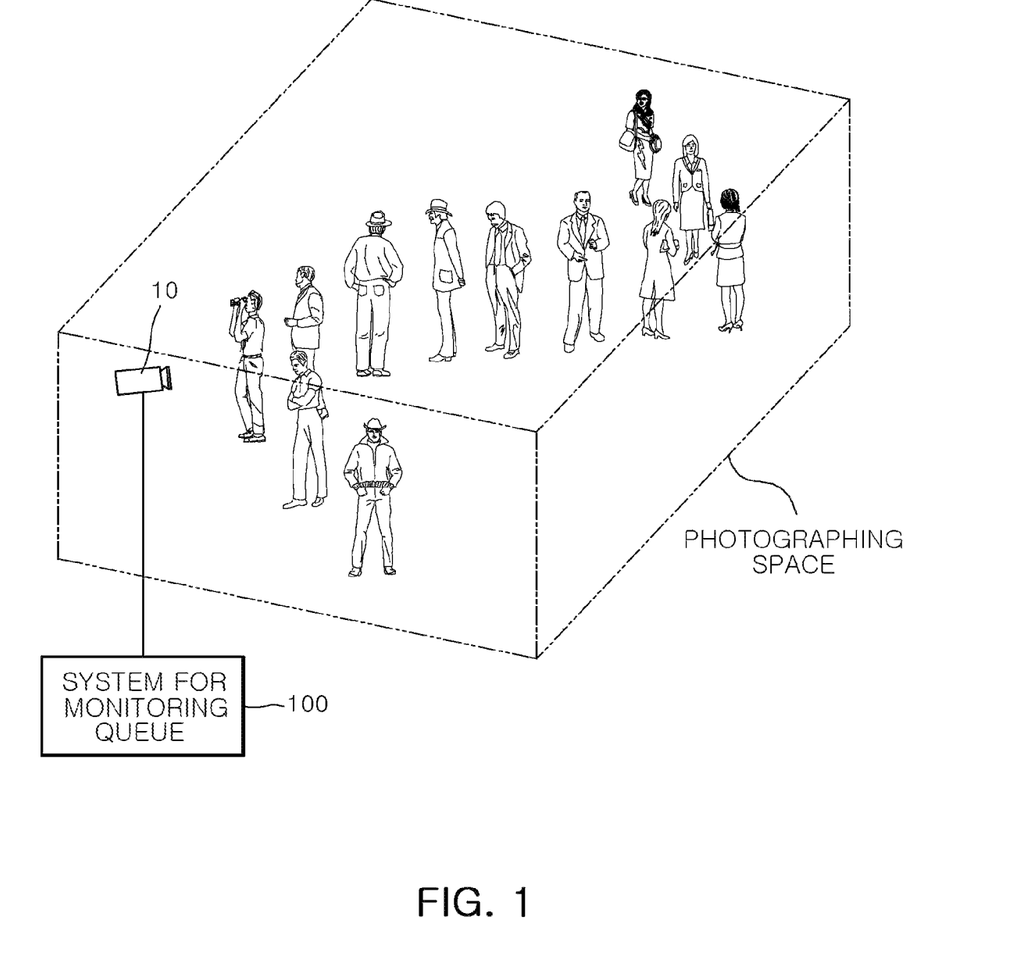
FIG. 1 is a view illustrating a configuration environment of a system for monitoring a queue according to an exemplary embodiment of the present invention.

First, FIG. 1 is a view illustrating a configuration environment of the system 100 for monitoring a queue according to an exemplary embodiment of the present invention, and, as illustrated in the figure, the system 100 for monitoring a queue may be connected with a TOF camera 10 in a wire or wireless communication type. The wire or wireless communication type may be achieved in various communication types and, for example, the wireless communication may include WLAN (Wireless LAN), DLNA (Digital Living Network Alliance), Wibro (Wireless Broadband), Wimax (World Interoperability for Microwave Access), GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), IEEE 802.16, LTE (Long Term Evolution), LTE-A (Long Term Evolution-Advanced), WMBS (Wireless Mobile Broadband Service), Bluetooth, RFID (Radio Frequency Identification), IrDA (Infrared Data Association: IrDA), UWB (Ultra Wideband), ZigBee, NFC (Near Field Communication), USC (Ultra Sound Communication), VLC (Visible Light Communication), Wi-Fi, and Wi-Fi Direct), and the like, and the wire communication may include PLC (Power Line Communication), USB communication, Ethernet, serial communication, fiber coaxial cable communication, and the like.

The TOF (Time Of Flight) camera 10 is, as illustrated in the figures, installed in a photographing space (3D space), and can provide an image obtained by intensity of a wavelength (brightness) using light having a wavelength of near-infrared light radiated to objects and a background through a light emitting unit and a light receiving unit disposed around a lens for the objects moving in a predetermined area and the background of the area in the photographing space, and image information including depth information of the background and the objects in the image by calculating distances after measuring the time differences when light radiated to the objects and the background returns.

Further, the TOF camera 10 may further include an image sensor, and in this case, it may provide image information including visible light image of the objects and the background.

That is, the TOF camera 10 can provide image information having depth information of the background and the objects in the photographing space.

Accordingly, the system 100 for monitoring a queue can recognize objects on the background on the basis of the depth information from the image information and provide information about the situation of a queue including a waiting time of objects and the queue pattern including the order and direction of the queue made by the plurality of different objects.

Further, the system 100 for monitoring a queue can not only easily recognize objects in an image, but exactly provide the information of a situation of a queue made by the objects by easily mapping an image included in image information and a background based on depth information of a photographing space, only using the depth information provided from the TOF camera 10 and simply calibrating the TOF camera 10, without using a complicated algorism for mapping a 2D image and a 3D space for recognizing objects, as in the related art, in the process of providing the situation of a queue.

Hereafter, although the TOF camera 10 is used in the following exemplary embodiments of the present invention, it should be understood that, other than the TOF camera 10, a stereo camera and various depth detection devices that detect a depth such as an image analyzer using a structured light pattern and generate depth information can be used.

On the basis of this configuration, detailed exemplary embodiments of the system 100 for monitoring a queue using the TOF camera 10 according to an embodiment of the present invention will be described hereafter with the reference to the drawings.

Figure 2:
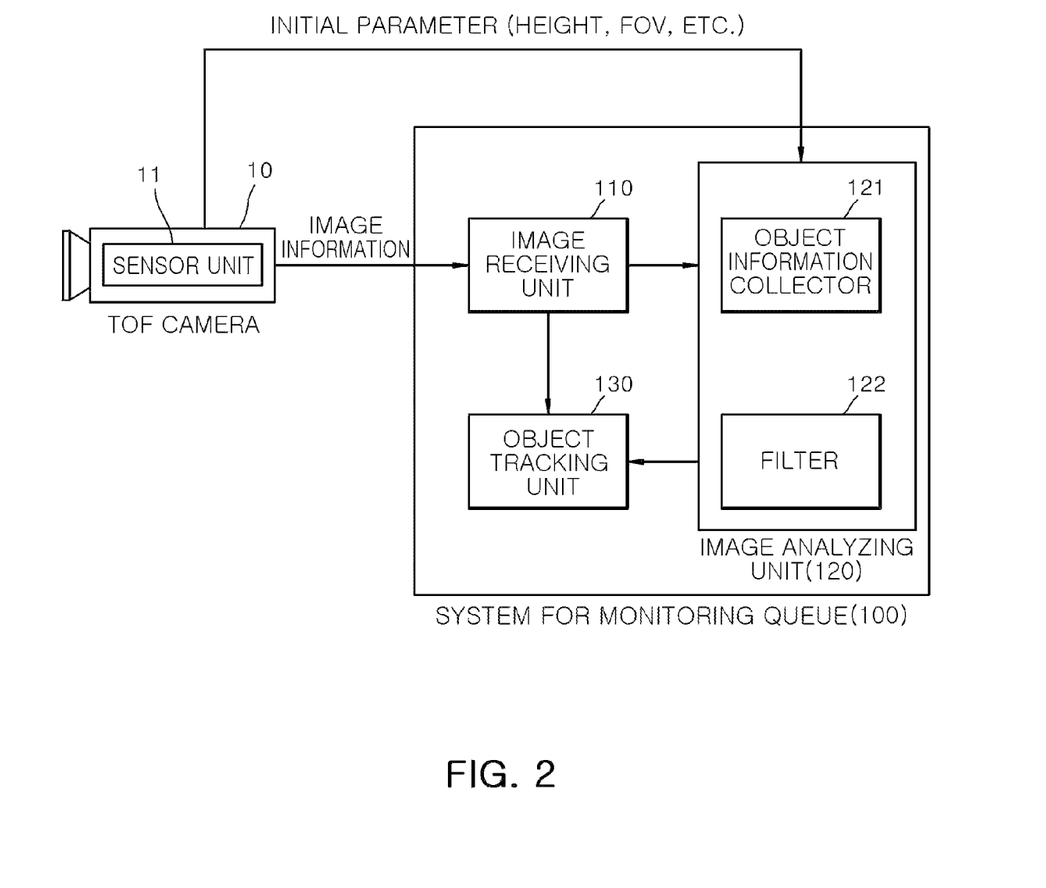
FIG. 2 is a view illustrating the configuration of the system for monitoring a queue according to an exemplary embodiment of the present invention.

FIG. 2 a view illustrating in detail the configuration of a system 100 for monitoring a queue using the TOF camera 10 according to an exemplary embodiment of the present invention, and as illustrated in the figure, the system 100 may include an image receiving unit 110, an image analyzing unit 120, and an object tracking unit 130.

Herein, the system 100 for monitoring a queue may be an independent system or may be included in an image recording device such as a DVR or an NVR. Further, the units 110, 120, and 130 in the system 100 for monitoring a queue may be achieved by a hardware circuit (for example, a CMOS-based logic circuit), a firmware, software, of a combination of them. For example, it may be achieved by transistors having various electric configurations, a logic gate, or an electronic circuit.

First, the image receiving unit 110 can receive depth information of objects and a background of a photographing space and image information including an image from the TOF camera 10 through wire/wireless communication and provide them to the image analyzing unit 120.

The image analyzing unit 120 can match the image to an actual photographing space by mapping the depth information of the background included in the image information to the image and recognize the objects by analyzing the image.

Herein, when the TOF camera 10 provides a visible light image, the image included in the image information may be a visible light image, and in the following description, it should be understood that the image included in the image information may include an image created by a near-infrared wavelength or an image created by a visible light wavelength.

To this end, the image analyzing unit 120, as illustrated in the figures, may include an object information collector 121 and a filter 122.

First, the object information collector 121 can map a background to an actual photographing space so that the sizes of objects in an image can be changed into sizes corresponding to the actual photographing space in order to easily extract only desired objects by classifying the sizes.

Figure 3:
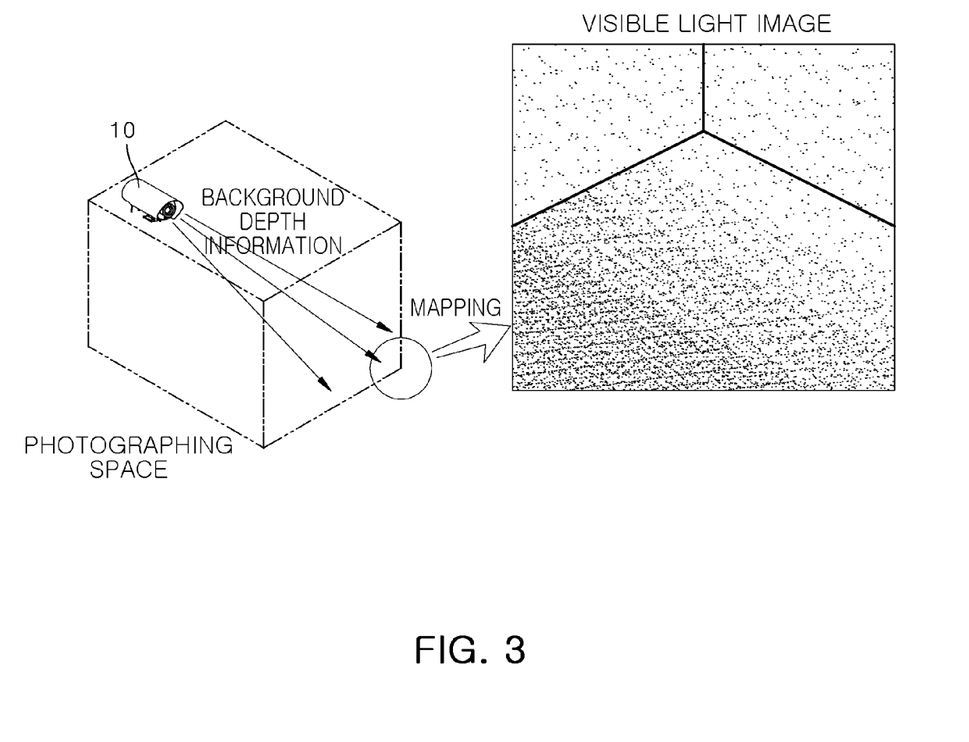
FIG. 3 is an exemplary view illustrating a process of mapping a background and a visible light image by the system for monitoring a queue according to an exemplary embodiment of the present invention.

For example, the object information collector 121, as illustrated in FIG. 3, can recognize an area corresponding to the background in an image and collect depth information of the area corresponding to the background from image information through background modeling that separates a background area that moves less than moving objects by analyzing the image included in the image information.

Herein, the object information collector 121 may use various algorisms for the background modeling, and for example, it may use a difference image method, an MOG (Model of Gaussian) algorism using GMM (Gaussian Mixture Models), a codebook algorism, and the like.

Accordingly, the object information collector 121 can provide depth information of the area corresponding to the background in an image so that the depth information can be determined, by mapping depth information of the area corresponding to the background to the image, so the area corresponding to the ground in the photographing space can be recognized.

Figure 4:
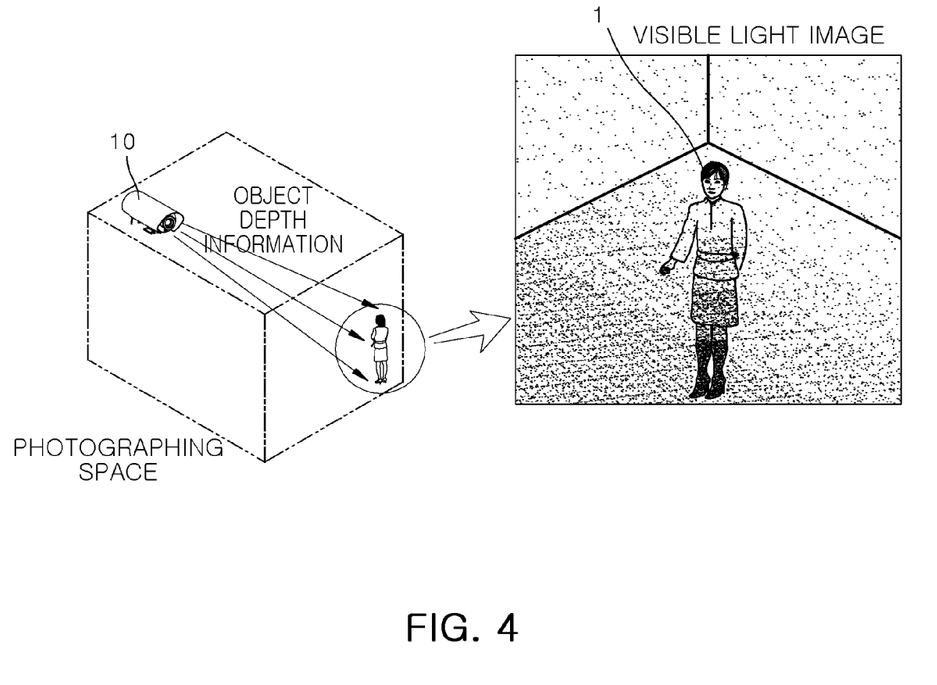
FIG. 4 is an exemplary view illustrating a process of recognizing an object by the system for monitoring a queue according to an exemplary embodiment of the present invention.

When the mapping is achieved, as illustrated in FIG. 4, and an object 1 is shown in the image, the object information collector 121 can recognize the object 1 by separating the object 1 and the background through image analysis such as background modeling.

Herein, the object information collector 121 maps the depth information of the background to an image and keeps it using an image having only the background and can recognize an area having depth information different from the kept depth information in the image included in image information that is received thereafter as an object area. Accordingly, the object information collector 121 may recognize the object 1 even only from the depth information.

Meanwhile, the object information collector 121 can calculate the height of the object 1 by comparing the depth information of the recognized object with the depth information of the background.

However, the depth information provided from the TOF camera 10 is not a value converted to correspond to the size of the actual photographing space, so in order to find out the actual height of the object 1, there is a need for calibration for converting it to correspond to the size of the actual photographing space.

Accordingly, the object information collector 121 can correct the height of the object 1, which is calculated on the basis of depth information included in image information, to the actual height, using initial parameters including the angle, the height, and the FOV (Field Of View) of the TOF camera 10 which are measured for the actual photographing space.

To this end, the TOF camera 10 has a sensing unit 11 including an acceleration sensor or a gyro sensor for determining the posture of the TOF camera 10, as illustrated in FIG. 2, and the sensing information about the height, the angle, and the FOV of the TOF camera sensed by the sensing unit 11 can be provided to the image analyzing unit 120.

Further, the object information collector 121 can receive the sensing information about the TOF camera 10 and generate and keep initial parameters.

Figure 5:
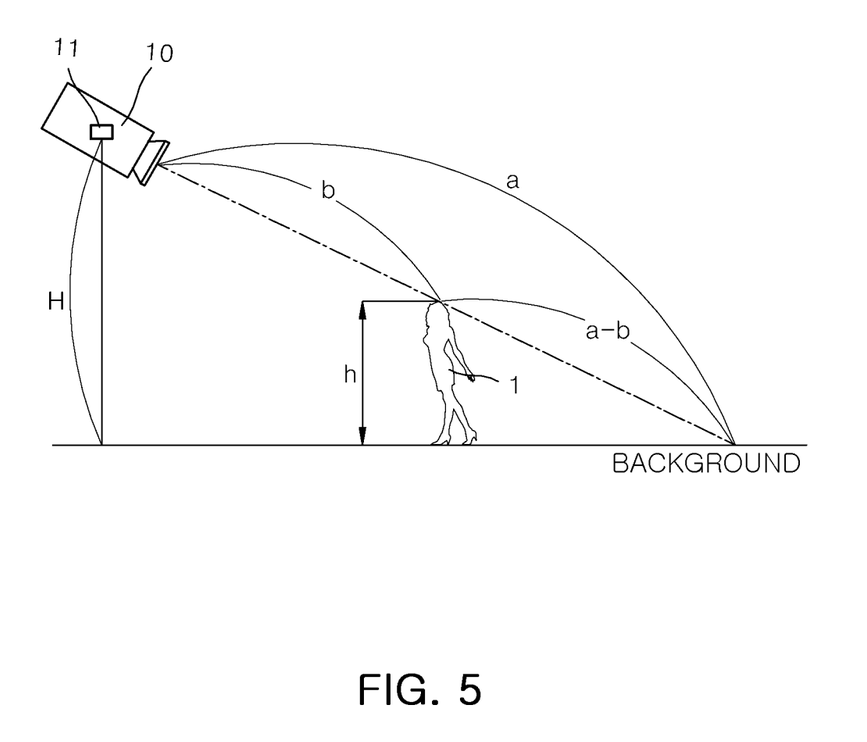
FIG. 5 is an exemplary view illustrating a process of calculating the height of an object by the system for monitoring a queue according to an exemplary embodiment of the present invention.

According to this configuration, as illustrated in FIG. 5, the object information collector 121 can correct and calculate the actual height h of the object by calculating a difference (a-b) between depth information a and b corresponding to a background and the object 1 respectively in the same line with the camera 10 in the image, putting the difference (a-b), the depth information 'a' of the background, and the initial parameters to the trigonometric function, and converting the height of the object 1 obtained from the depth information of the object 1 and the background mapped to the image in accordance with the initial parameters of the TOF camera 10 (the height H, the FOV, and the angle of the TOF camera).

Further, the object information collector 121 can recognize an area corresponding to the ground on the basis of the depth information of the background in an image and calculate the height of the ground where the object 1 is positioned using the depth information of the ground. Furthermore, the object information collector 121 can calculate the actual height of the object 1 in consideration of the height of the ground where the object 1 is positioned, by subtracting the height of the ground from the height of the object and converting it into the actual height of the object 1 in accordance with the initial parameters.

In addition, the object information collector 121 can calculate the actual height of the object 1 in various ways using the depth information and the initial parameters.

Accordingly, the object information collector 121 can put the photographing space into an image by mapping the background, which is the depth value of the actual photographing space, to the image, and it is possible to exactly calculate the actual height of the object 1 by performing calibration on the basis of only the initial parameters of the TOF camera without using a complicated algorism.

According to this configuration, the object information collector 121 can recognize a plurality different objects obtained from image information and calculate the actual heights of objects measured on the basis of the ground having the same height.

Meanwhile, the filter 122 can filter the actual heights of object into a plurality of predetermined different height values in order to filter only desired objects in objects recognized through the object information collector 121.

Accordingly, the filter 122 can extract only the objects having a predetermined height or more, and for example, when a desired object is a person, it can filter an animal that does not satisfy the predetermined height or a thing moved by a person (for example, a shopping cart).

Further, when people are gathered, the filter 122 can provide the people such that they can be discriminately recognized.

Figure 6A:
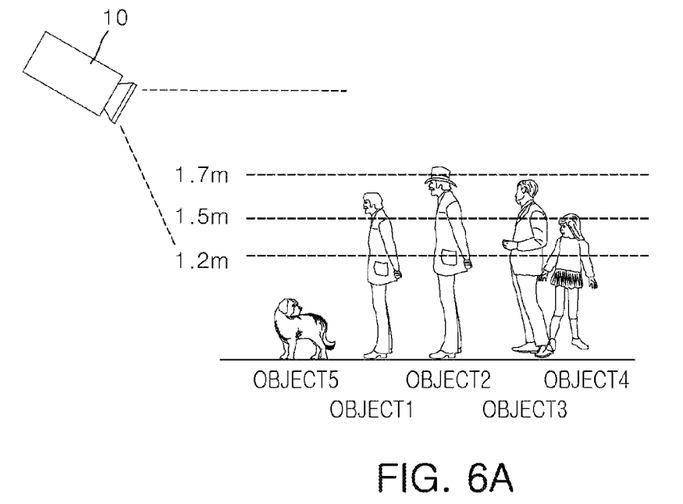
FIGS. 6A and 6B are exemplary views illustrating a process of creating cluster set information by the system for monitoring a queue according to an exemplary embodiment of the present invention.

A configuration for this process is described with reference to FIGS. 6A to 7. As illustrated in FIG. 6A, the filter 122 can receive respectively recognition information of an object 1 to an object 5 and height information about the actual heights of the object 1 to the object 5 from the object information collector 121.

Figure 6B:
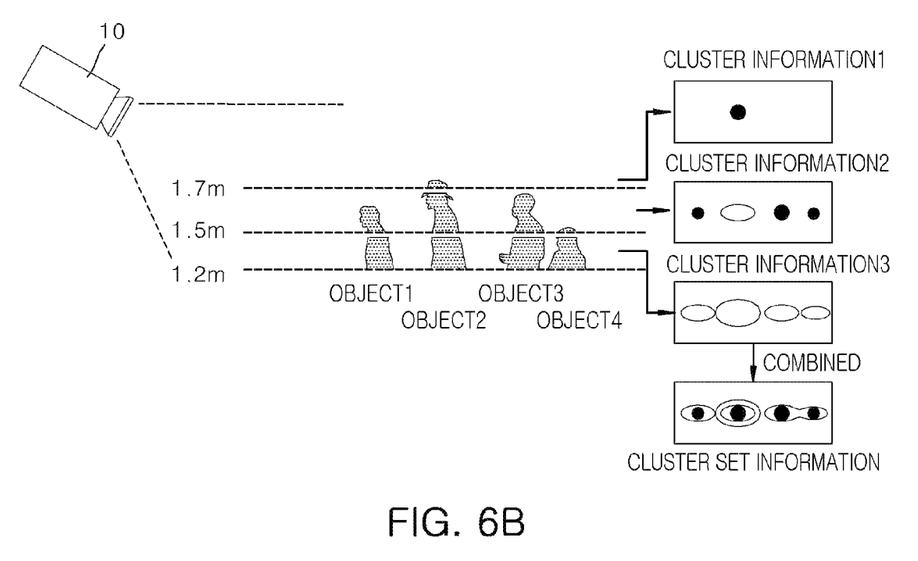

Thereafter, the filter 122, as illustrated in FIG. 6b, can sequentially filter the objects in image information in the order of height, using a plurality of predetermined different height values.

For example, the filter 122 can filter the other areas except for the areas having a height or more which is used for filtering in accordance with the actual heights of the objects, in which the filter 122 can easily filter objects that are not people such as the object 5 using height values over a predetermined level in filtering.

Accordingly, the filter 122 extracts the areas having a height value over a level used in filtering in the areas corresponding to objects estimated as people, as cluster information, and the cluster information may mean a set of pixels included in the areas corresponding to a height value or more which is used in the filter in the areas corresponding to the objects.

Figure 7:
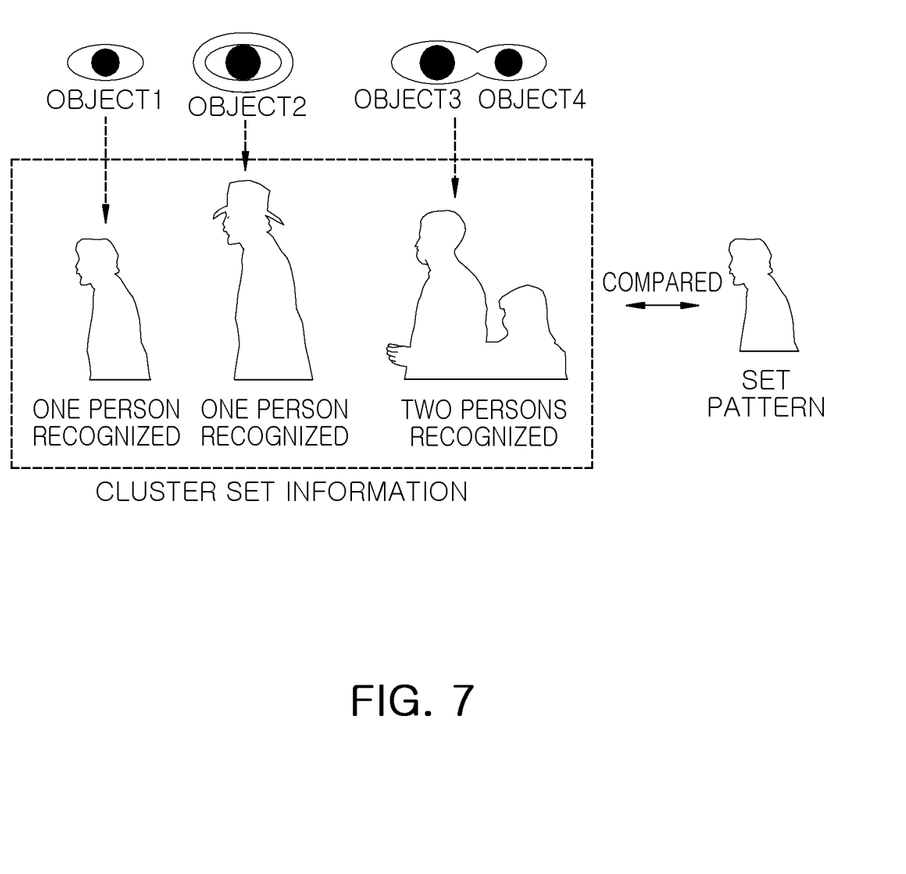
FIG. 7 is an exemplary view illustrating a process of detecting an object using cluster set information by the system for monitoring a queue according to an exemplary embodiment of the present invention.

Meanwhile, the filter 122, as illustrated in FIG. 7, combines cluster information at each height values by filtering objects to different height values, and can create cluster set information by sequentially and three-dimensionally accumulating the cluster information corresponding to the height values in accordance with the magnitudes of the height values.

For example, the filter 122, as illustrated in FIG. 6B, can create cluster set information having a contour shape, as illustrated in FIG. 7, by accumulating cluster information 1 to cluster information 3 for an object 2, and can convert the cluster set information into a 3D type in accordance with the shape of the contour.

Herein, when there is an overlap area between different cluster information in the process of sequentially accumulating a plurality of items of cluster information obtained for different height values, the filter 122 can create the cluster set information by removing the overlap area from cluster information having a lower height value.

Further, for the convenience of description, the cluster information obtained for objects is provided as cluster information 1 to cluster information 3, but it should be understood that cluster information obtained by filtering different objects (for example, object 2 and object 3) to the same height value may have different values.

Meanwhile, the filter 122 provides the cluster set information to the object tracking unit 130 and the object tracking unit 130, as illustrated in FIG. 7, can determine whether the 3D cluster set information has the same pattern as a predetermined pattern by comparing them, and accordingly, it is possible to recognize an object expected as a person by detecting cluster set information having a predetermined pattern corresponding to a person.

According to this configuration, even if two objects having different height values such as an object 3 and an object 4 are gathered as one object, two items of cluster set information corresponding to the predetermined pattern are detected from the object 3 and the object 4, so the object tracking unit 130 can easily recognize the objects.

Figure 8:
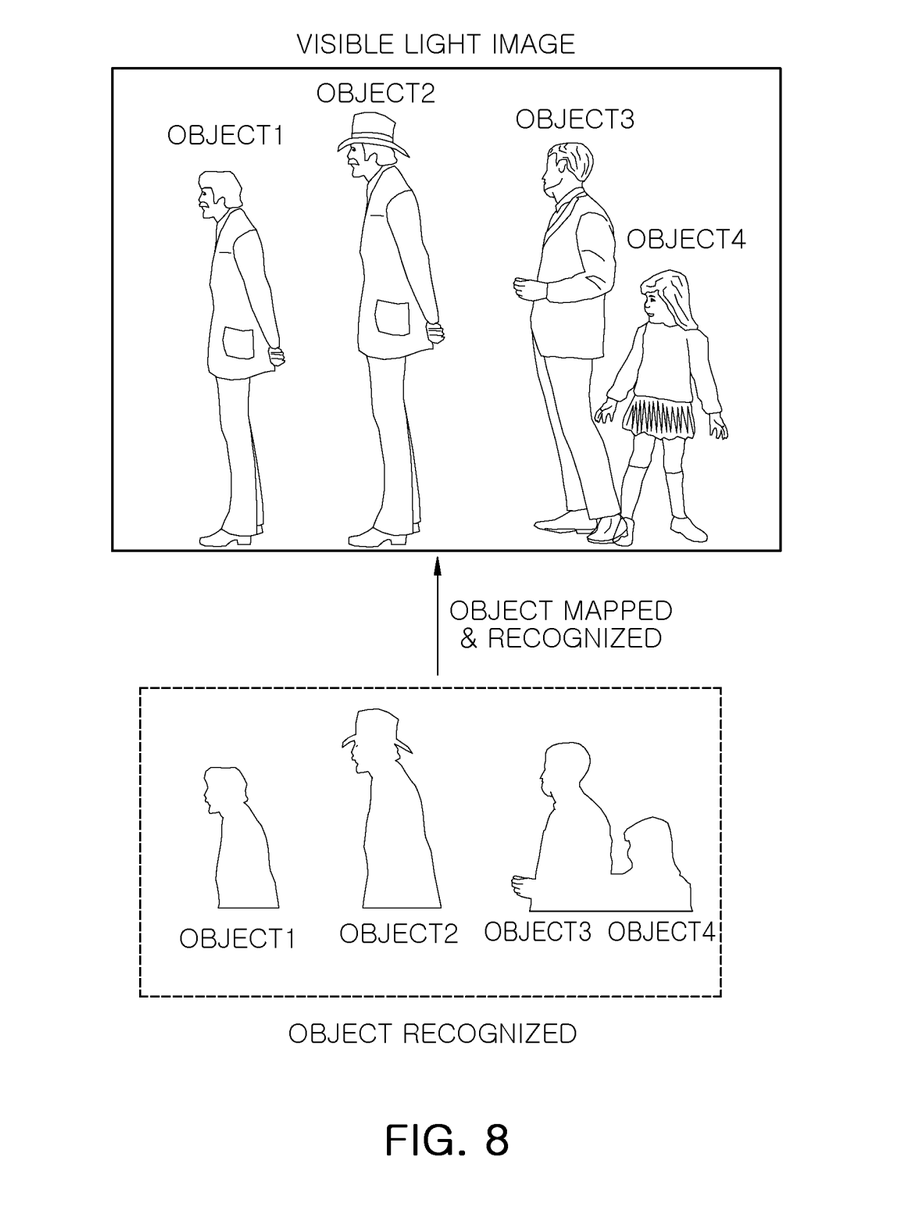
FIG. 8 is an exemplary view illustrating a process of mapping an object to a visible light image by the system for monitoring a queue according to an exemplary embodiment of the present invention.

Meanwhile, the object tracking unit 130, as illustrated in FIG. 8, can recognize and tracking an object in an image by mapping cluster set information corresponding to a predetermined pattern to the image included in the image information.

Herein, the object tracking unit 130 can track the recognized object using an object tracking algorism, and can continuously track an object, for example, using a Kalman filter.

Further, when a plurality of objects constitute a queue, the object tracking unit 130 can easily recognize only the object in the queue and provide a queue situation information including waiting time, a waiting order, and the pattern of the queue.

Figure 9A:
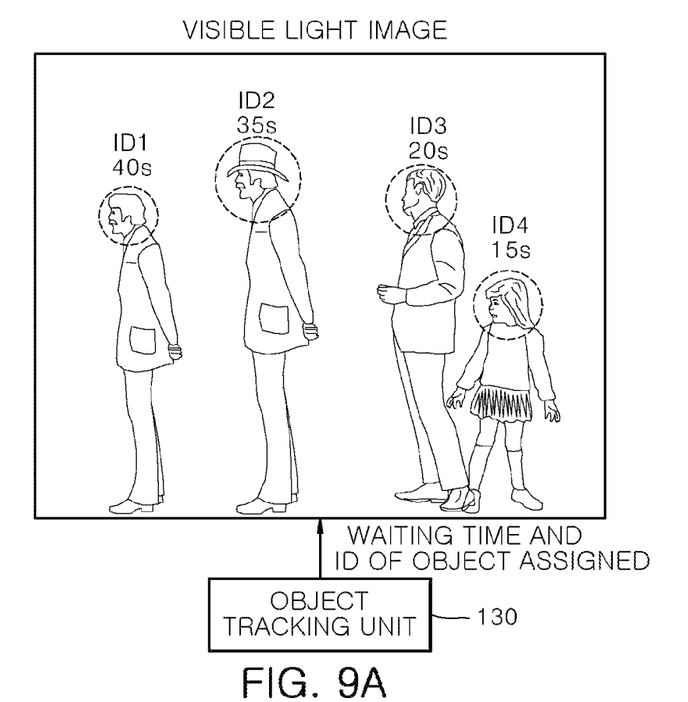
Figure 9B:
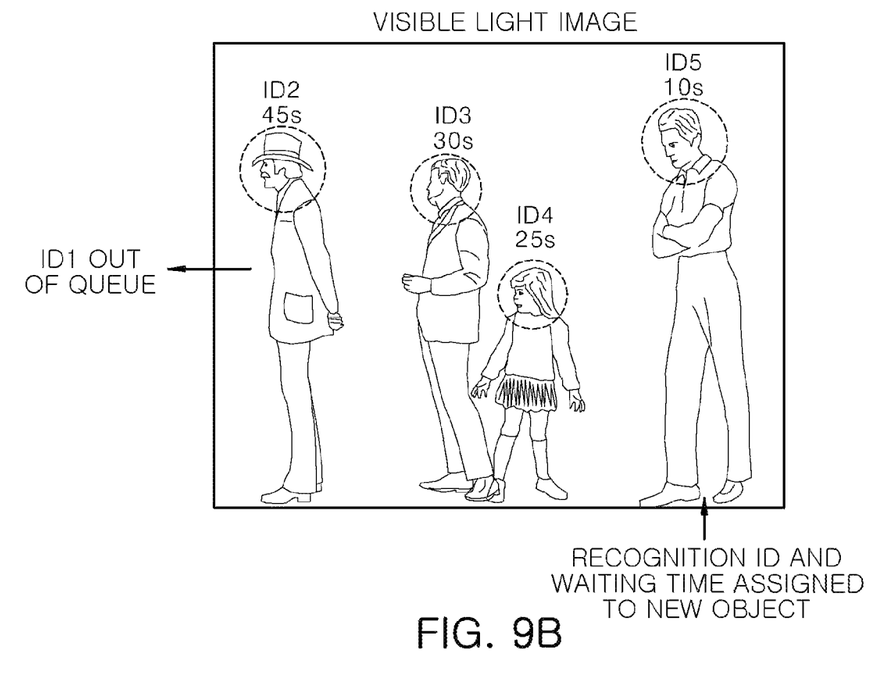

FIGS. 9A and 9B illustrate a configuration for this process. As illustrated in FIG. 9A, the object tracking unit 130 can assign waiting time information for counting the time from recognizing the objects recognized in an image through the cluster set information to the objects. The object tracking unit 130 can assign a unique ID with the waiting time information.

Further, the object tracking unit 130 can track objects moving in the queue by counting the waiting time of the objects having the waiting time information, and as illustrated in FIG. 9B, when an object comes out of the queue, it can remove the waiting time information and the unique ID of the object.

Further, when cluster set information about a new object is received from the image analyzing unit 120, the object tracking unit 130 can recognize the new object by mapping corresponding cluster set information to the new object, assign waiting time information and a unique ID to the new object from the point of recognition time, and track it.

According to this configuration, the object tracking unit 130 can easily track an object moving in a queue, that is, can easily track an object on the basis of only the waiting time information without using a complicated object tracking algorism, so the system becomes less complicated.

Meanwhile, according to this configuration, the object tracking unit 130 provides information about the queue situation by determining the direction and the pattern of the queue in accordance with the waiting orders of the objects in the queue. and easily discriminates objects not related to the queue and removes them from object to track, which is described in detail with reference to FIGS. 10A to 11B.

Figure 10A:
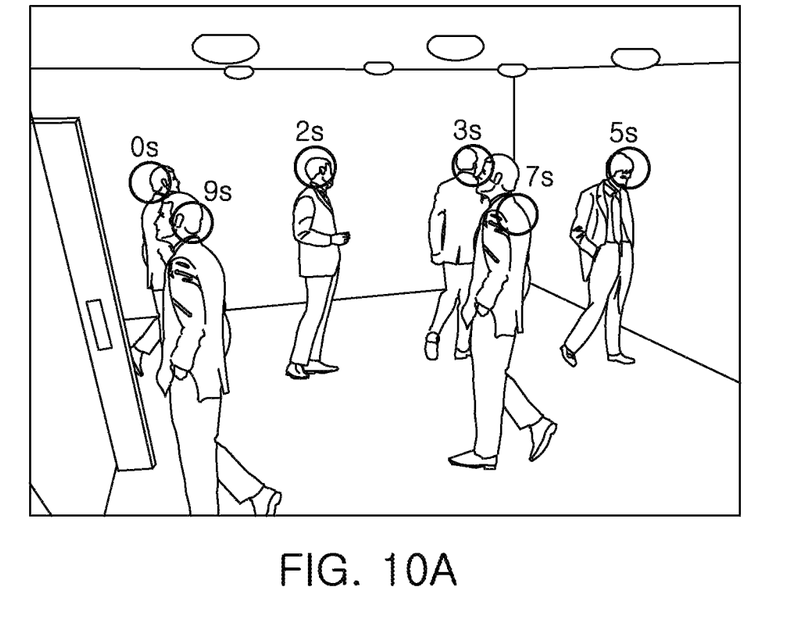

First, the object tracking unit 130 can assign waiting time information to objects recognized in an image, as illustrated in FIG. 10A, update the waiting time information by counting the waiting time of the objects in real time, and determine the waiting orders in the order of longer waiting time in accordance with the waiting time information.

Figure 10B:
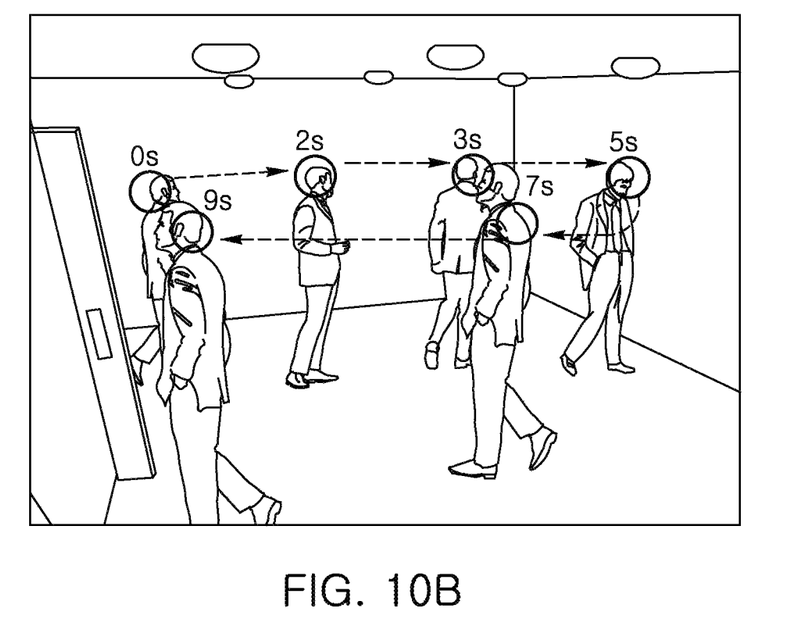

Further, as illustrated in FIG. 10B, it is possible to create queue pattern information by determining the direction of the queue in accordance with movement vectors of objects based on tracking the objects in the queue.

Figure 11A:
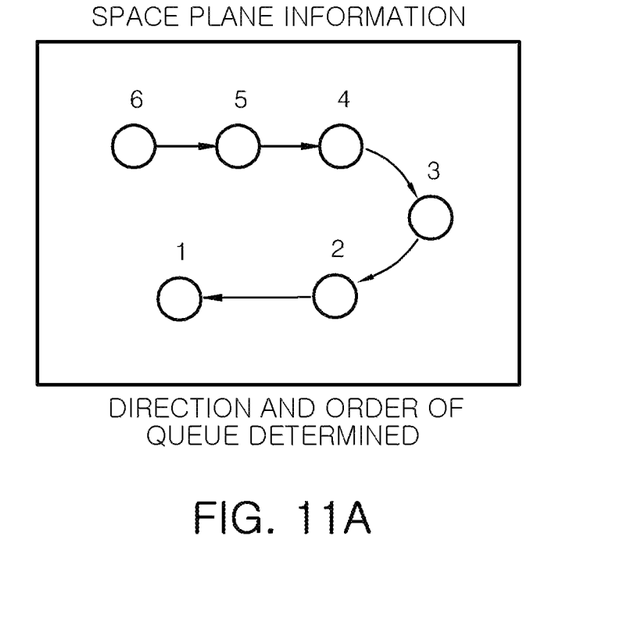
FIGS. 11A and 11B are exemplary views illustrating a process of determining a queue by the system for monitoring a queue according to an exemplary embodiment of the present invention.

Further, the object tracking unit 130, as illustrated in FIG. 11A, can recognize the area corresponding to the ground in a background on the basis of depth information of the area corresponding to the background in an image where the depth information of the background is mapped from the image analyzing unit 120, and create 2D plane information for the ground.

Further, the object tracking unit 130 can display object areas corresponding to objects by mapping cluster set information to the 2D plane information and apply the pattern information of the queue to correspond to the object areas displayed in the 2D plane information corresponding to the ground.

Figure 11B:
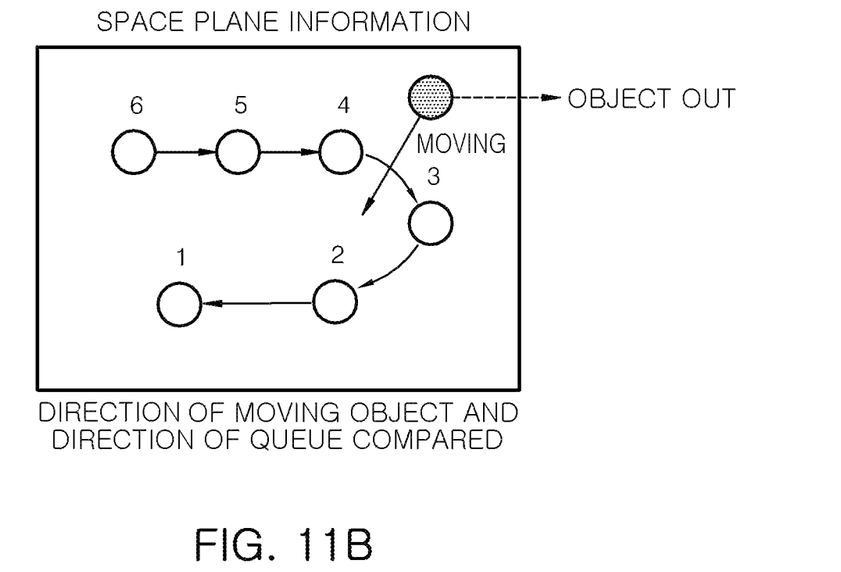

Accordingly, when any one of the objects detected through the cluster set information has a movement vector different from the direction of the queue according to the pattern information of the queue, as illustrated in FIG. 11B, the object tracking unit 130 can determine that the object is not related to the queue and easily remove it from the objects to track.

Meanwhile, the object tracking unit 130, in accordance with this configuration, can output an image where a background is mapped and image information created by assigning waiting time information and an ID to an object detected from the image through an output unit, and the output unit may include various output devices such as a speaker and a display. The output unit may be included in the system for monitoring a queue or may be independent from the system.

Further, although only one queue is detected in the exemplary embodiment described above, it may be possible to detect a plurality of queues and provide the situations of the queues by determining the direction and the patterns of the queues.

Figure 12:
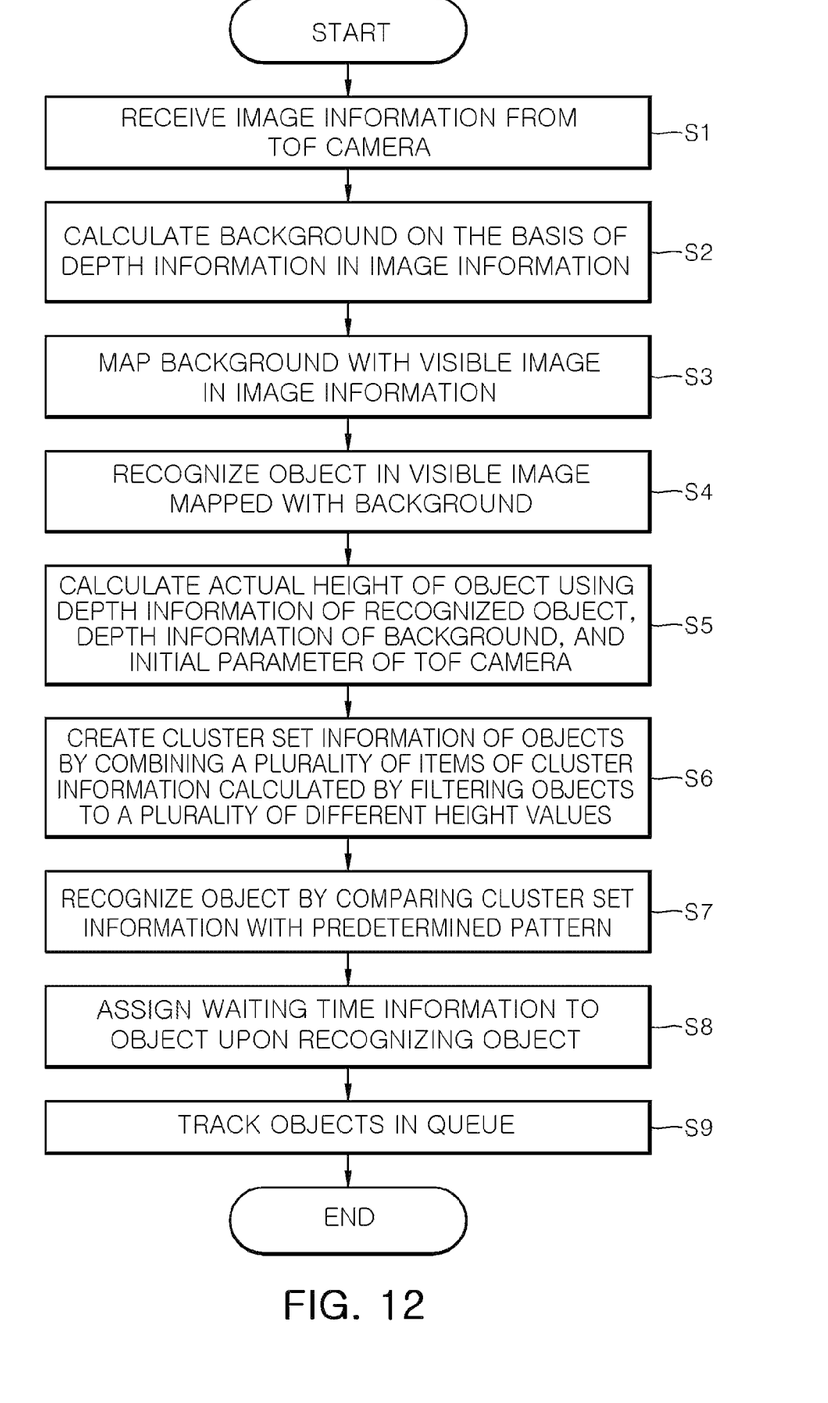
FIG. 12 is a flowchart illustrating a method of monitoring a queue according to an exemplary embodiment of the present invention.

FIG. 12 is a flowchart illustrating a method of monitoring a queue according to an exemplary embodiment of the present invention, and as illustrated in the figure, the system 100 for monitoring a queue made by objects in a photographing space using the TOF camera 10 can receive image information including an image and depth information of the objects and the background of the photographing space through the TOF camera 10 (S1).

Next, the system 100 for monitoring a queue can recognize the area of the background by analyzing the image in the image information (S2) and map the actual photographing space to the image by mapping the depth information of the background area to the image (S3).

Thereafter, the system 100 for monitoring a queue can recognize objects by analyzing the image information (S4), and calculate the actual heights of the objects, using initial parameters including the height and angle of the TOF camera 10 measured by the sensing unit 11 in the TOF camera 10 and the depth information of the objects and the background obtained from the image information (S5).

Next, the system 100 for monitoring a queue can create cluster set information composed of a plurality of items of cluster information calculated by filtering the objects in the image information to a plurality of different height values (S6).

Thereafter, the system 100 for monitoring a queue can recognize the objects by comparing the cluster set information with a predetermined pattern (S7), assign waiting time information for counting the time from the point of time when the objects are recognized, to the objects (S8), and track the objects in the queue in accordance with the queue order (S9).

In this configuration, when a user wants to recognize an object in an image with eyes, the image included in the image information may be a visible light image.

Embodiments of the present invention were described above with reference to the drawings. However, the present invention is not limited to the embodiments and may be modified in various ways by those skilled in the art without departing from the scope of the present invention described in claims.

What is claimed is:

1. A system for monitoring a queue, the system comprising a processor, wherein said processor configured to:
   receive image information including depth information of objects in the queue and a background of a photographing space from a depth detection device having a sensor, via a network;
   calculate actual heights of the objects using the depth information of the objects and the background obtained from the image information and initial parameters including a height and an angle of the depth detection device measured by the sensor;
   create cluster set information composed of a plurality of cluster information calculated by filtering the objects in the image information with a plurality of different height values; and
   identify each of the objects by comparing the cluster set information with a predetermined pattern;
   assign waiting time information to the identified each object in order to count waiting time of the identified each object when the each object is identified; and
   track the identified each object in order of the assigned waiting time information,
   wherein the cluster information is a set of pixels obtained for one height value and the cluster set information is created by three-dimensionally accumulating sets of pixels corresponding to the cluster information in accordance with height values, and
   wherein when cluster information obtained for different height values are overlapped, said processor is configured to remove cluster information obtained for a lower height value among the overlapped cluster information.

2. The system of claim 1, wherein the depth detection device is one of a Time Of Flight (TOF) camera, a stereo camera, and an image analyzer using a structured light pattern.

3. The system of claim 1, wherein said processor is configured to
   recognize a ground in the background,
   create a queue pattern information on a queue pattern of the queue by determining areas where the objects are positioned on the ground, order and direction of the queue, and
   provide information about a queue situation by applying the queue pattern information to plane information corresponding to the ground.

4. The system of claim 3, wherein said processor is configured to determine the direction of the queue in accordance with movement vectors of the objects calculated by tracking the objects in the queue.

5. The system of claim 4, wherein said processor is configured to
   determine the direction of the queue based on the movement vectors of the objects and
   remove an object having movement vector different from the direction of the queue from the objects to track.

6. The system of claim 3, wherein said processor is configured to
   update the assigned waiting time information by counting waiting time in real time and
   determine waiting orders of the objects in the queue in order of longer waiting time in accordance with the updated waiting time information.

7. The system of claim 1, wherein said processor is configured to calculate the actual heights of the objects by
   calculating a difference in the depth information of the background and objects respectively in the same line with a camera from the image information and
   using the calculated difference, the depth information of the background and the initial parameters.

8. The system of claim 1, wherein said processor is configured to calculate the plurality of cluster information by filtering an object having an actual height lower than the plurality of different height values.

9. The system of claim 1, wherein
   the image information further includes a visible light image, and
   said processor is configured to map the background and the visible light image to each other based on the depth information.

10. A method of monitoring a queue made by objects in a photographing space, the method performed by a system comprising a processor and connected with a depth detection device having a sensor via a network, the method comprising:
    receiving image information including depth information of objects in the queue and a background of a photographing space from the depth detection device via the network;
    calculating actual heights of the objects using the depth information of the objects and the background obtained from the image information and initial parameters including a height and an angle of the depth detection device measured by the sensor;
    creating cluster set information composed of a plurality of cluster information calculated by filtering the objects in the image information with a plurality of different height values;
    identifying each of the objects by comparing the cluster set information with a predetermined pattern;
    assigning waiting time information to the identified each object in order to count waiting time of the identified each object when the each object is identified; and
    tracking the identified each object in order of the assigned waiting time information,
    wherein the cluster information is a set of pixels obtained for one height value and the cluster set information is created by three-dimensionally accumulating sets of pixels corresponding to the cluster information in accordance with height values, and
    wherein the creating of cluster set information further comprising
       when cluster information obtained for different height values are overlapped, removing cluster information obtained for a lower height value among the overlapped cluster information.

* * * * *